United States Patent
Neerdaels

(10) Patent No.: US 9,461,961 B2
(45) Date of Patent: *Oct. 4, 2016

(54) USING VIRTUAL DOMAIN NAME SERVICE (DNS) ZONES FOR ENTERPRISE CONTENT DELIVERY

(71) Applicant: Akamai Technologies, Inc., Cambridge, MA (US)

(72) Inventor: Charles J. Neerdaels, Aptos, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/563,209

(22) Filed: Dec. 8, 2014

(65) Prior Publication Data
US 2015/0088962 A1  Mar. 26, 2015

Related U.S. Application Data

(63) Continuation of application No. 13/625,227, filed on Sep. 24, 2012, now Pat. No. 8,909,699, which is a continuation of application No. 12/351,870, filed on Jan. 12, 2009, now Pat. No. 8,275,867, which is a continuation of application No. 10/466,797, filed on May 24, 2004, now Pat. No. 7,478,148.

(60) Provisional application No. 60/262,171, filed on Jan. 16, 2001.

(51) Int. Cl.
| | |
|---|---|
| G06F 9/46 | (2006.01) |
| H04L 29/12 | (2006.01) |
| H04L 29/06 | (2006.01) |
| H04L 29/08 | (2006.01) |
| G06Q 10/06 | (2012.01) |

(52) U.S. Cl.
CPC .......... *H04L 61/1511* (2013.01); *G06Q 10/06* (2013.01); *H04L 29/06* (2013.01); *H04L 29/12066* (2013.01); *H04L 29/1282* (2013.01); *H04L 29/12594* (2013.01); *H04L 61/2007* (2013.01); *H04L 61/3025* (2013.01); *H04L 61/6013* (2013.01); *H04L 67/327* (2013.01); *H04L 69/329* (2013.01)

(58) Field of Classification Search
USPC ................. 709/201–207, 216–219, 223–226
See application file for complete search history.

(56) References Cited

U.S. PATENT DOCUMENTS

| | | | |
|---|---|---|---|
| 6,108,703 | A | 8/2000 | Leighton et al. |
| 6,154,777 | A | 11/2000 | Ebrahim |
| 6,178,511 | B1 | 1/2001 | Cohen et al. |
| 6,185,598 | B1 | 2/2001 | Farber et al. |
| 6,523,027 | B1 | 2/2003 | Underwood |
| 6,542,964 | B1 | 4/2003 | Scharber |

(Continued)

Primary Examiner — Jude Jean Gilles
(74) Attorney, Agent, or Firm — David H. Judson

(57) ABSTRACT

A domain to be published to an enterprise ECDN is associated with a set of one or more enterprise zones configurable in a hierarchy. When a DNS query arrives for a hostname known to be associated with given content within the control of the ECDN, a DNS server responds by handing back an IP address, by executing a zone referral to a next (lower) level name server in a zone hierarchy, or by CNAMing to another hostname, thereby restarting the lookup procedure. At any level in the zone hierarchy, there is an associated zone server that executes logic that applies the requested hostname against a map. A name query to ECDN-managed content may be serviced in coordination with various sources of distributed network intelligence.

8 Claims, 4 Drawing Sheets

(56) References Cited

U.S. PATENT DOCUMENTS

| | | |
|---|---|---|
| 6,754,699 B2 | 6/2004 | Swildens et al. |
| 7,096,266 B2 | 8/2006 | Lewin |
| 7,260,639 B2 | 8/2007 | Afergan et al. |
| 7,478,148 B2 * | 1/2009 | Neerdaels ............... H04L 29/06 709/223 |
| 7,600,025 B2 * | 10/2009 | Lewin .................... H04L 29/06 709/218 |
| 8,275,867 B2 * | 9/2012 | Neerdaels ............... H04L 29/06 709/203 |
| 8,909,699 B2 * | 12/2014 | Neerdaels ............... H04L 29/06 705/39 |
| 2004/0193695 A1 | 9/2004 | Salo et al. |
| 2005/0240558 A1 * | 10/2005 | Gil .................... G06F 17/30893 |

\* cited by examiner

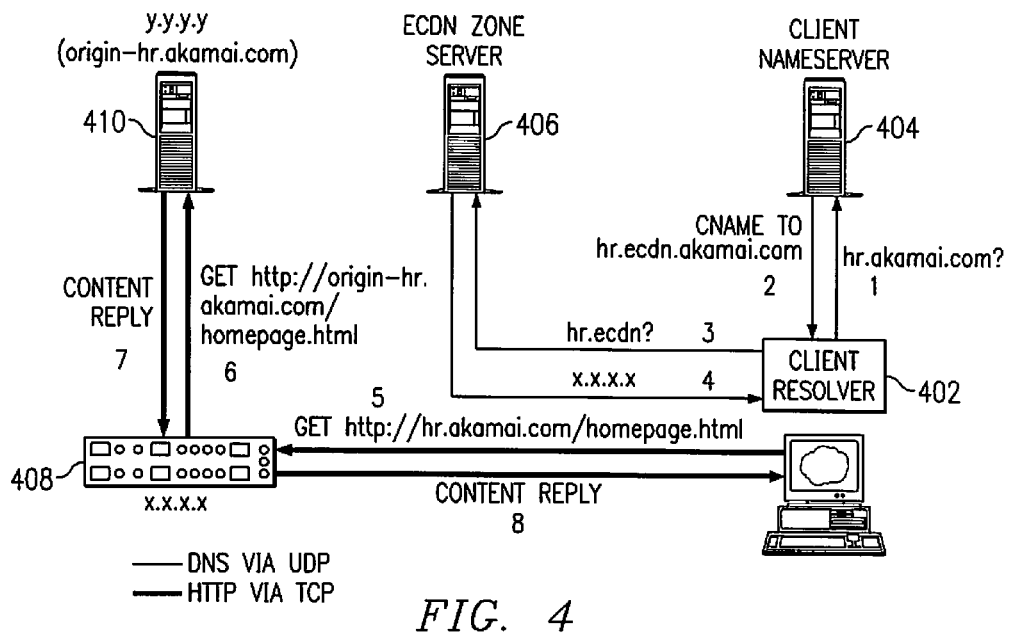
FIG. 4
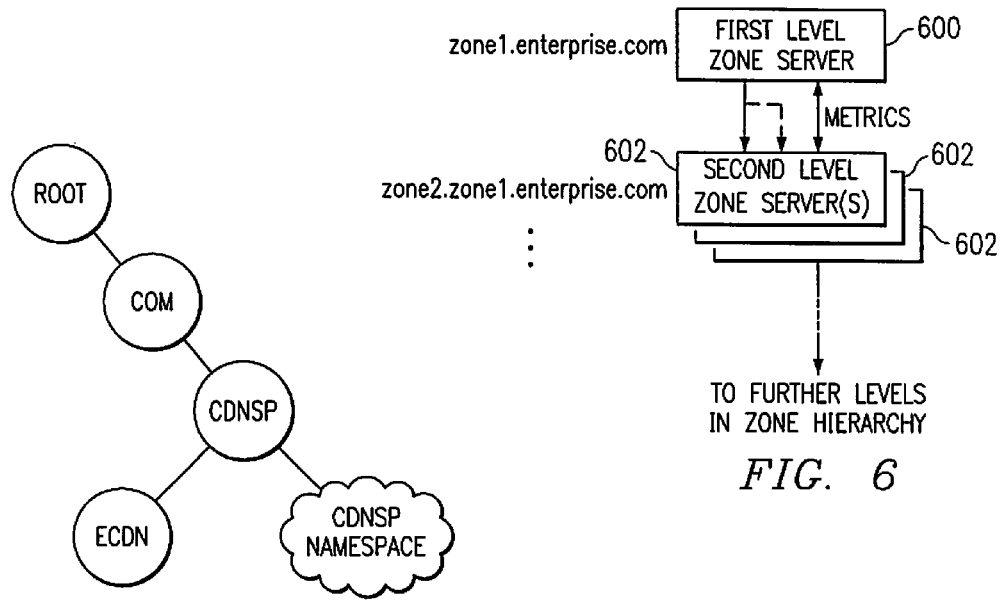
FIG. 5
FIG. 6

USING VIRTUAL DOMAIN NAME SERVICE (DNS) ZONES FOR ENTERPRISE CONTENT DELIVERY

BACKGROUND OF THE INVENTION

1. Technical Field

This disclosure relates generally to content delivery and management within a private enterprise network.

2. Description of the Related Art

It is well-known to deliver digital content (e.g., HTTP content, streaming media and applications) using an Internet content delivery network (ICDN). A content delivery network or "CDN" is a network of geographically distributed content delivery nodes that are arranged for efficient delivery of content on behalf of third party content providers. A request from a requesting end user for given content is directed to a "best" replica, where "best" usually means that the item is served to the client quickly compared to the time it would take to fetch it from the content provider origin server.

Typically, a CDN is implemented as a combination of a content delivery infrastructure, a request-routing mechanism, and a distribution infrastructure. The content delivery infrastructure usually comprises a set of "surrogate" origin servers that are located at strategic locations (e.g., Internet network access points, Internet Points of Presence, and the like) for delivering copies of content to requesting end users. The request-routing mechanism allocates servers in the content delivery infrastructure to requesting clients in a way that, for web content delivery, minimizes a given client's response time and, for streaming media delivery, provides for the highest quality. The distribution infrastructure consists of on-demand or push-based mechanisms that move content from the origin server to the surrogates. An effective CDN serves frequently-accessed content from a surrogate that is optimal for a given requesting client. In a typical CDN, a single service provider operates the request-routers, the surrogates, and the content distributors. In addition, that service provider establishes business relationships with content publishers and acts on behalf of their origin server sites to provide a distributed delivery system. A well-known commercial CDN service that provides web content and media streaming is provided by Akamai Technologies, Inc. of Cambridge, Mass.

Enterprises have begun to explore the desirability of implementing content delivery infrastructures to address several problems. Currently, enterprise users typically experience slow and expensive access to Internet content. Slow access to business critical data available on the Internet hurts productivity, and the cost of providing good access, e.g., by building bigger networks and by deploying and managing caching infrastructure, is large. In addition, many IT organizations cannot deliver the required quality of service for Internet content delivery due to lack of talent and expertise. Yet another reason corporations are exploring CDNs is because of the slow, expensive and often cumbersome access to and within the entity's intranet. As corporate intranets quickly become a critical component of business process in many large companies, fast and efficient access to the data and applications on the intranet is a high priority for many IT departments. Nevertheless, current intranet delivery solutions are inadequate, and solving the problems, e.g., by building bigger internal networks, deploying and managing caches, and distributing application front ends, is extremely expensive. To address these deficiencies, several large software vendors are attempting to build ecosystems to provide web-based front ends to many enterprise applications, however, distributing these application from front ends efficiently, in of itself, will be a critical IT problem that current technologies do not address. Finally, enterprises are considering CDN technology due to slow, expensive access to business partner applications and information provided by current techniques and solutions. Business-to-business applications (such as ordering, inventory, and pricing management) between business partners is done today by linking partners with a physical network. These applications are moving to the Internet/intranet, and the need to link business partners together in an efficient way with web-based front ends is another critical IT problem that is not addressed by today's solutions.

BRIEF SUMMARY

It is a general object to define and implement one or more virtual zones within an enterprise namespace to facilitate enterprise content delivery behind a corporate firewall.

It is another general object to provide an enterprise content delivery network that coexists with existing or "legacy" Domain Name Service (DNS) infrastructure to facilitate mapping of requests for enterprise resources to surrogate servers, e.g., common caching appliances, application servers, distributed storage and database management systems, and streaming media servers.

It is yet another general object to define and implement one or more so-called "virtual" zones within an enterprise namespace to facilitate content delivery behind a corporate firewall over an enterprise content delivery network (ECDN).

Another object is to enable an ECDN DNS to coexist with an existing enterprise DNS and to enable content delivery with only minimal configuration changes to the existing infrastructure using virtual zones. A given host or subdomain to be published to the ECDN is aliased into a virtual zone namespace preferably using a DNS Canonical Name (CNAME).

A still further object is to implement an enterprise content delivery network wherein any arbitrary hierarchical namespace can be implemented and wherein each layer of the namespace inherits the namespace above.

According to this disclosure, a domain to be published to an enterprise ECDN is associated (either by static configuration or dynamically) with a set of one or more enterprise zones configurable in a hierarchy. When a DNS query arrives for a hostname known to be associated with given content within the control of the ECDN, a DNS server preferably responds in one of three (3) ways: (a) handing back an IP address, e.g., for an ECDN intelligent node that knows how to obtain the requested content from a surrogate or origin server; (b) executing a zone referral to a next (lower) level name server in a zone hierarchy, or (c) CNAMing to another hostname, thereby essentially restarting the lookup procedure. In the latter case, this new CNAME causes the resolution process to start back at the root and resolve a new path, probably along a different path in the hierarchy. At any particular level in the zone hierarchy, preferably there is an associated zone server. That server preferably executes logic that applies the requested hostname against a map, which, using known techniques, may be generated from given (static, dynamic, internally-generated or third party-sourced) performance metrics. Thus, a given name query to ECDN-managed content may be serviced in coordination with various sources of distributed network intelligence. As a result, the invention provides for a distributed, dynamic globally load balanced name service.

According to a more specific aspect, a domain to be published to the ECDN is associated (either by static configuration or dynamically) with a set of one or more enterprise zones configurable in a hierarchy. When a request for content is received from a given client in the enterprise (or otherwise accessible through the firewall), a name query to the enterprise's legacy DNS is directed to the conFIG.d ECDN zone primary server. This primary ECDN zone server associates, and relays via CNAME, a name query with an ECDN intelligent node (or resolves directly to a given content origin server). This association may be based on given conditions within the network, server load conditions, or some combination of various known metrics. With ECDN virtual zones, maps that associate a given request to a server may be local or global, static or dynamic. While the maps typically are generated within the ECDN infrastructure, they could also be affected be external agents providing hints or modifications. If multiple zones are used in a hierarchy, a first level ECDN zone server directs the name query to a second level ECDN zone server, and so on, until the appropriate response is generated. At any one level the particular zone server need not be able to resolve the entire name; rather, the particular zone server need only be able to resolve the portion required for directing the next level of resolution. For example: the zone server for the namespace containing b in the hostname a.b.c.d.e may have no idea where the final resolution will end up, but it should know which set of servers may be authoritative for the namespace containing c. Because DNS readily allows one to "carve out" zones in the namespace of a particular domain (e.g., ecdn.company.com can be managed by a different authoritative DNS server than the rest of company.com), the creation of the first level ECDN zone on the existing DNS infrastructure allows the two systems to coexist and undergo modification in parallel without interference with one another. This enables the present invention to be readily integrated into an existing or legacy DNS solution with minimal reconfiguration.

Thus, according to this disclosure, an existing DNS infrastructure is augmented with one or more ECDN zone servers, and requests for content to be delivered over the ECDN are resolved through the one or more zone servers. In one embodiment, this function is achieved by identifying a given enterprise domain to be published to the ECDN, and having a network administrator (or a person acting on the administrator's behalf) modify an existing DNS name record for that enterprise domain. In this embodiment, the administrator CNAMEs the enterprise domain to a domain identified by a so-called "virtual zone" that is managed on an ECDN zone server (and, thus, forms part of the ECDN). In particular, this process enables the enterprise domain to be managed (by the enterprise or a third party acting on the enterprise's behalf) as part of the ECDN, typically by the ECDN zone server on one of the intelligent nodes (or some other machine, such as a client name server). A similar process is repeated for every new domain or subdomain being distributed by the ECDN. Any client downloading a URL referring to the enterprise domain then gets directed to the ECDN zone server, which directs the client to an ECDN intelligent node. The client passes a host header to the ECDN node to identify the actual host.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

FIG. 4 illustrates a technique for enterprise content delivery using virtual DNS zones according to this disclosure;

FIG. 5 illustrates a representative DNS namespace in which an enterprise virtual zone is created according to the disclosed subject matter;

FIG. 6 illustrates a zone hierarchy in which first and second level ECDN zone servers are used to resolve a name query to an enterprise domain that has published to the ECDN.

DETAILED DESCRIPTION OF THE PREFERRED EMBODIMENT

Figure 1:
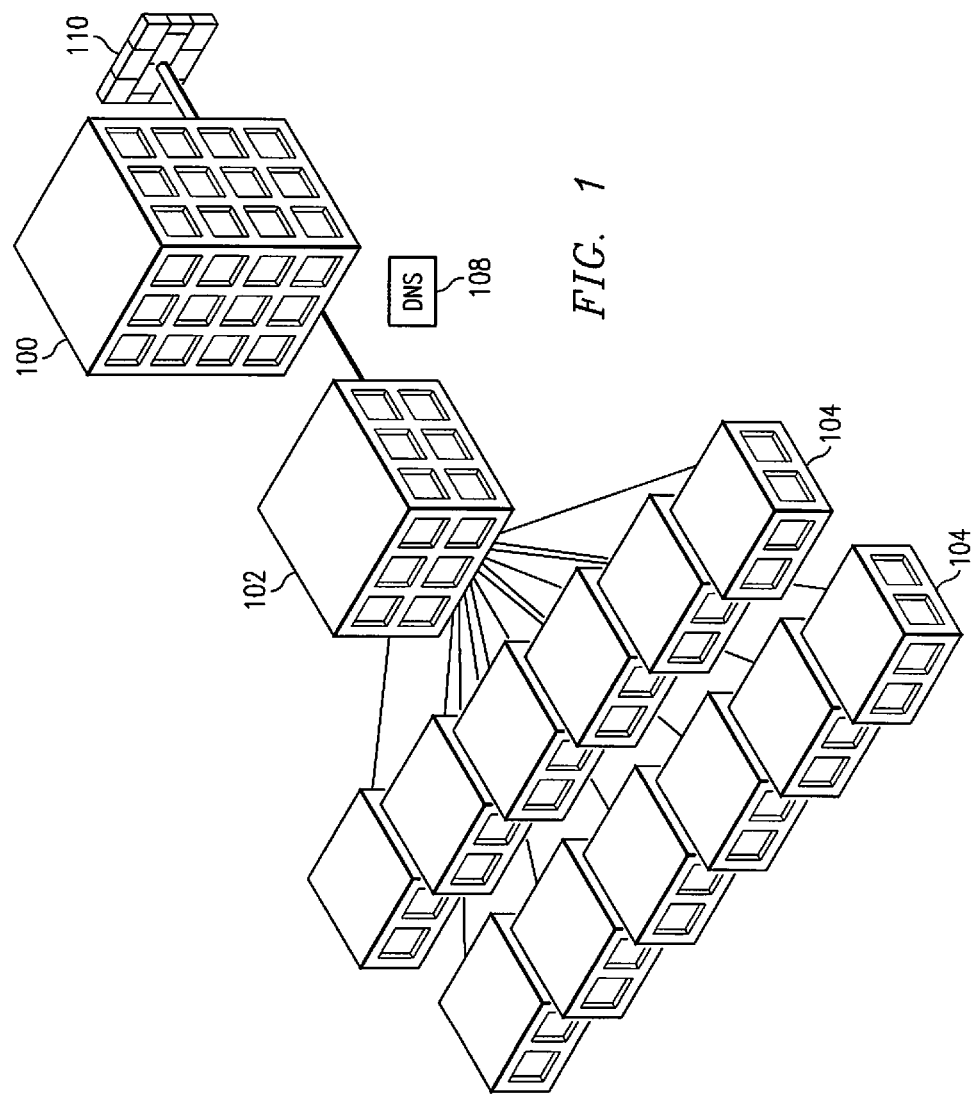
FIG. 1 is a block diagram of an enterprise in which the enterprise content delivery network (ECDN) may be implemented.
Figure 2:
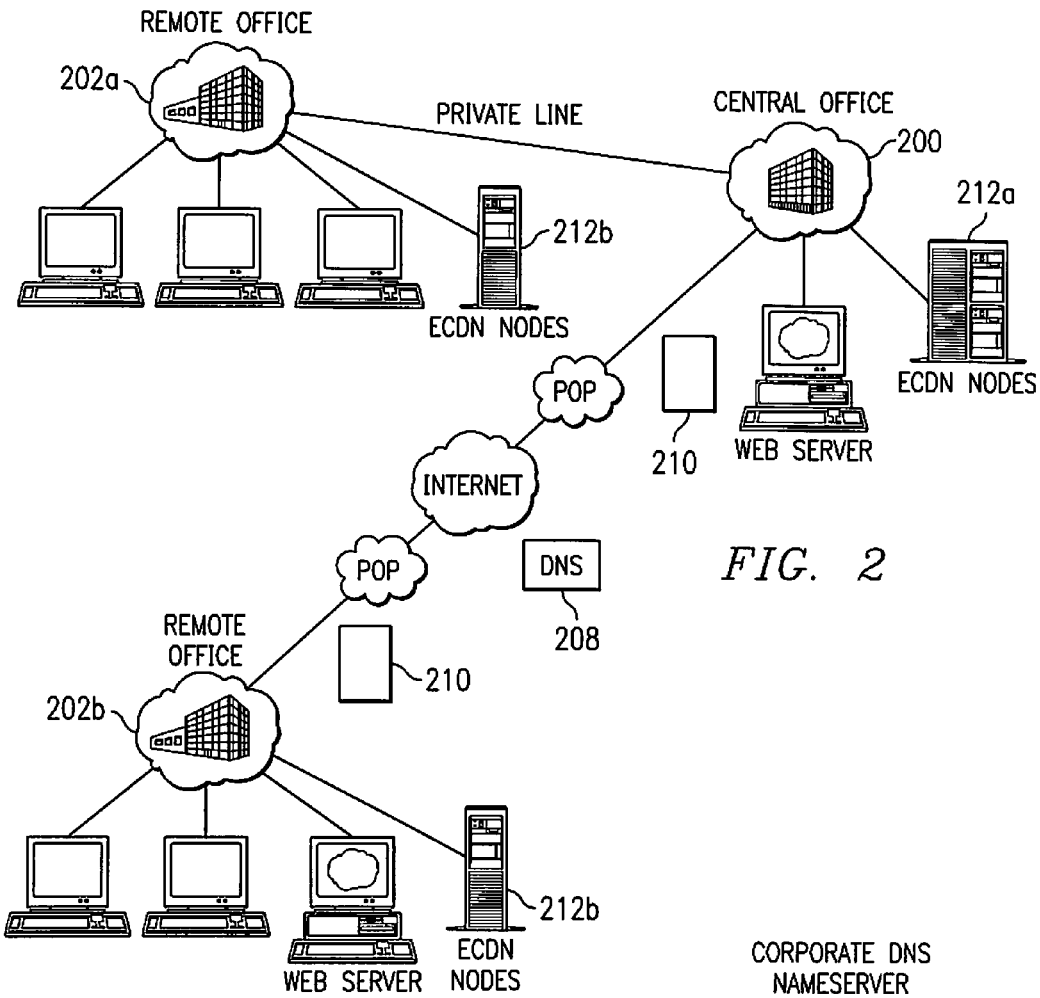
FIG. 2 is another enterprise environment in which the subject matter may be implemented.

The disclosed subject matter is implemented within an "enterprise" or "enterprise environment." Referring to FIG. 1, a representative enterprise environment in which the present invention is implemented comprises at least one primary central office 100 (e.g., with central IT support), which is connected to one or more regional datacenters 102, with each datacenter connected to one or more remote branch offices 104 via private line, or via the public Internet (most likely with a virtual private network or "VPN"). The branch offices 104 may be fully (or partially) meshed amongst themselves. FIG. 2 illustrates another enterprise computing environment that includes a central office 200 and a pair of remote offices 202. As shown in FIG. 2, remote office 202a is connected to the central office 200 over a private line, which refers to a line not generally routable over the public Internet (e.g., frame relay, satellite link, microwave link, or the like), and remote office 202b is connected to the central office 200 over a virtual private network (VPN) typically over the public Internet, or in other known ways. A given remote office may be an office of an enterprise business partner if an appropriate business relationship between the enterprise and the partner exists.

Enterprise networks are generally based on one one of two network types—point-to-point private/leased line, or VPN over public lines (often fully meshed between offices). From a topological view, actual enterprise networks may not operate in a hierarchical sense for connectivity. From a logical management view, however, the servers remain in a relatively weak hierarchy (as illustrated in either FIG. 1 or 2) with more valuable and management intensive systems usually existing at more centralized data centers, and very few of these types of systems being deployed in remote branched offices. This architecture is usually a function of where information and management reside, which drives the cost of management for the overall IT network and IT services. Thus, for example, in the more complex enterprise such as shown in FIG. 1, regional datacenters tend to have more critical information than branch offices, and the central office tends to have the most critical information. It is assumed for purposes of illustration that the enterprise hosts given internal content that it desires to have stored, cached and delivered to end users in the enterprise. Such internal enterprise content, or ECDN content, generally is non publicly-available content (in whatever format) that an enterprise desires to make available to permitted users within the enterprise or within a third party partner of the enterprise. An end user typically operates a computer having an Internet browser. The authoritative content and application servers 106 (in FIG. 1) and 206 (in FIG. 2) being published into the CDN (each identified here as an "ECDN server") can exist in any location, although from a practical perspective they may often be somewhat centrally-located. Such servers are sometimes referred to an origin servers. The enterprise is also assumed to be IP based and to have a Domain Name Service (DNS) 108 (in FIG. 1) and 208 (in FIG. 2). From a security standpoint, the enterprise network manager roughly divides the world of the network into trusted and untrusted, which usually corresponds to internal and external entities. Firewalls 110 (in FIG. 1) and 210 (in FIG. 2) are typically conFIG.d to allow most outbound traffic, with severe restrictions on inbound traffic. This allows for access to requested services without providing third parties a foothold for intrusion. More sophisticated systems usually create an security entity called a DMZ, which can be thought of as a set of two firewalls, with certain assets like email, DNS, web servers, etc. sitting between them. Each firewall has a different set of filtering rules, with the innermost generally allowing valid traffic from a host within the DMZ to enter the enterprise. Generally, no externally initiated traffic is allowed to pass both sets of filters.

For purposes of illustration, an enterprise content delivery network (ECDN) is provisioned into the enterprise network topology of FIG. 2. The ECDN may be implemented in a standalone manner, or it may be part of a larger Internet CDN, in which case the Internet CDN service provider may manage the ECDN on behalf of the enterprise. Various techniques for extending an ICDN into an enterprise are described in U.S. Pat. No. 7,096,266, which is commonly-owned and which is incorporated herein by reference. Referring back to FIG. 2, ECDN functionality is provided by locating one or more intelligent nodes (each referred to as an IN) that execute appropriate management, provisioning, monitoring and routing applications to facilitate the distribution, delivery and management of the private enterprise content delivery network. Thus, for example, an IN 212*a* may be located in the central office 200 and each of the remote offices may include an IN box 212*b* as indicated. An IN box 212 is typically a computer, namely, a server, having at least one Pentium-class processor, an operating system (e.g., Linux, Windows NT, Windows 2000, or the like), and some amount of disk storage and system memory. Using the IN boxes, the enterprise (or the CDNSP on its behalf) has the ability to map and load balance users inside the enterprise (perhaps as part of the global ICDN), to fetch content from inside the firewall, to collect log information, to deploy software, to distribute live streams, and to provide other ICDN functionality.

Thus, an illustrative enterprise CDN ("ECDN") is comprised of a variety of origin and surrogate servers and a distributed set of intelligence nodes (IN). An origin server can be any server that is intended to respond to a user request for information and includes, for example, common caching appliances, application servers, distributed storage and database management systems, and streaming media servers. The intelligence nodes tie the entire set of distributed nodes and services into a single, virtual service cloud. The ECDN intelligence nodes may have different configurations. Thus, for example, a first type (e.g., IN 212*a* in central office 200) may be sized (in terms of processing power and memory) for the largest datacenters, and such machines would be aggregation points for monitoring, logging, management and request routing. A second type of intelligence node (e.g., IN 212*b*) may be sized for branch office deployment, and such servers would be sized to optimize local behavior. The nodes may be placed in a hierarchy with an IN of the first type acting as a parent. An intelligence node of the second type would typically include a caching engine.

Architecturally, an ECDN such as illustrated above is similar to an Internet content delivery network (ICDN) and comprises: HTTP, streaming and DNS server nodes deployed across a customer network. Generalizing, the ECDN provides the enterprise with the following: a namespace and an associated request routing mechanism (to control how to navigate the CDN), storage, caching and streaming (to control how and where are objects stored and distributed), optionally an application environment (to facilitate application extensibility), management and provisioning (to control how the CDN is deployed and managed), and reporting/auditing (to provide visibility into the behavior). An ECDN such as described above provides an application, streaming and content delivery platform so that enterprise content may be delivered and managed in a decentralized fashion while providing a tightly-integrated solution with a customer's storage, network, application and management solutions.

Enterprises today either outsource their Domain Name Service (DNS) or, as described above, run a DNS infrastructure (e.g., one or more DNS servers). A DNS namespace has certain characteristics, as are well-known. Each unit of data in a DNS distributed database is indexed by a hostname. These names are simply leaves in a tree representation, which is often called a domain namespace. Each node in the tree is labeled with a simple name. The fully qualified hostname of any node in the tree is the sequence of labels on the path from that node to the root. A zone is a subtree of the domain name space. Names at the leaves of the tree generally represent individual hosts, whose names resolve to one or more IP addresses. It has become common in instances of virtual hosting within ISPs to have multiple customers share a single machine, therefore having multiple hostnames reolve to a single machine or server farm. CDN technology to date has additionally made it common for a single hostname to potentially resolve to any one of thousands of machines, though at any given time the set of possible hostnames is conFIG.d and fixed. The term zone usually relates to a set of hosts within a single authoritative server's namespace, whereas a single zone could include multiple sub-domains. Thus, e.g., if foo.com and eng.foo.com are both handled by the same nameserver, they are both in the same zone; but, if foo.com's nameserver refers a lookup to a different authority for resolution, they would be considered separate zones.

An organization administrating a domain can divide it into subdomains. Each of those subdomains can be delegated to other organizations, in which case the organization receiving the delegation becomes responsible for maintaining all the data in that subdomain. The machines or programs executing on those machines that store information about the domain namespace are often called name servers. Name servers generally have complete information about some part of the domain namespace, namely, a zone. In such case, the name server is then said to have authority for that zone. A name server can also maintain cached information—or non-authoritative information, which is obtained by communicating with an authoritative name server. A zone contains the domain names and data that a domain contains, except for domain names and data that are delegated elsewhere. If a subdomain of the domain has not been delegated, the zone also contains the domain names and data in the subdomain.

Figure 3:
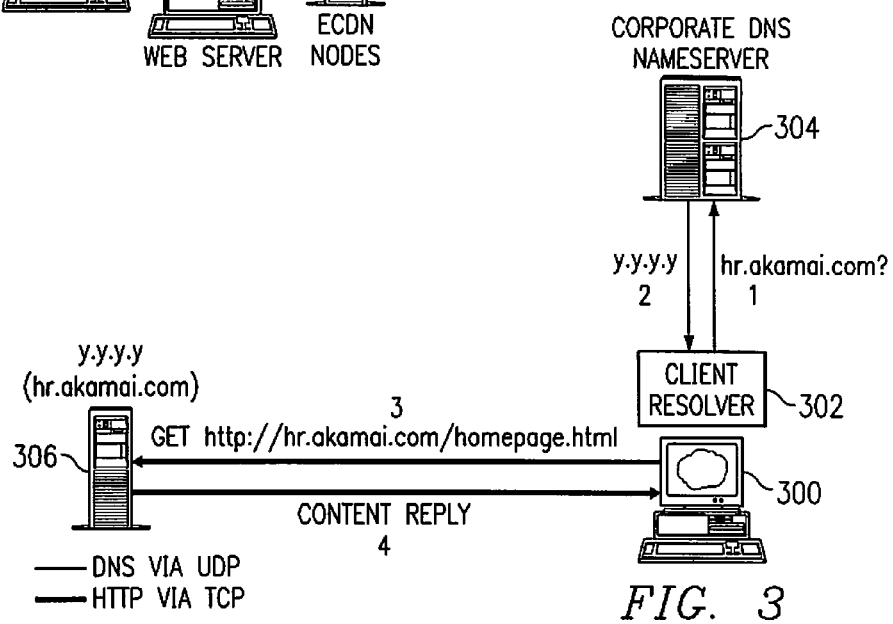
FIG. 3 illustrates a known technique for handling a request for content in an enterprise using a legacy DNS infrastructure.

For purposes of the present invention, it is assumed that the enterprise operates (or has operated) DNS servers, that those servers manage data held in zones, and that each zone is a complete database for a particular "pruned" subtree of the domain space. As noted above, the zone data is authoritative, in that it contains an accurate (typically, the most accurate) representation available for a particular set of hostnames. At least one host in the enterprise stores enterprise content that the enterprise desires to make available to permitted end users (enterprise or partner employees). The enterprises use the existing DNS infrastructure to resolve client requests for content at that host. FIG. 3 illustrates the known prior art. In this example, it is assumed that the user desires to retrieve the enterprise internal homepage, which is a page located, in this example, at a URL such as hr.company.com/homepage.html. To this end, the user, or client 300, interacts with DNS via a resolver 302, typically residing on the same machine. As is well-known, a resolver is a client process that accesses a name server. Programs running on a host that need information from a domain name space use the resolver. In DNS BIND, for example, the resolver is a set of library routines that query a name server, interpret responses, and return the information to the program/process that requested it. Thus, with reference to FIG. 3. the resolver 302 interacts with the enterprise name server 304 to resolve client queries, which are then returned to the client. In the example shown in FIG. 3, the client resolver 302 makes a DNS request (in this example "who is hr.company.com?") to the corporate DNS name server 304, which returns a reply with an actual IP address y.y.y.y of the host on which the document is stored. The client resolver 302 then uses a DNS A record to build a connection to the actual web server 306, and issues an appropriate HTTP request to the web server 306 (e.g., via a GET hr.company.com/homepage.html). The web server 306 responds with the content reply to complete the request.

According to this disclosure, the existing DNS infrastructure is augmented with one or more ECDN zone servers, and requests for content to be delivered over the ECDN are resolved through the one or more zone servers. In the simplest embodiment, this function is achieved by identifying a given enterprise domain to be published to the ECDN, and having a network administrator (or a person acting on the administrator's behalf) modify an existing DNS name record for that enterprise domain. In this embodiment, the administrator CNAMEs the enterprise domain to a domain identified by a so-called "virtual" zone that is managed on an ECDN zone server (and, thus, forms part of the ECDN). In particular, this process enables the enterprise domain to be managed (by the enterprise or a third party acting on the enterprise's behalf) as part of the ECDN, typically by the ECDN zone server on one of the intelligent nodes (or some other machine, such as a client name server). A similar process is repeated for every new domain or subdomain being distributed by the ECDN. Any client downloading a URL referring to the enterprise domain then gets directed to the ECDN zone server, which directs the client to an ECDN IN. The client passes a host header to the ECDN IN to identify the actual host.

FIG. 4 illustrates an embodiment of this disclosure. DNS requests typically occur over UDP, while HTTP requests typically occur over TCP. The enterprise is identified as "akamai" for illustrative purposes only. In this example, the client resolver 402 makes a DNS request for "hr.akamai.com" (step (1)) to the conFIG.d name server 404. This name server may be part of the legacy DNS infrastructure, as described above. This same name server 404 (running a suitable DNS BIND version) looks up hr.akamai.com and sees that the hostname resides within the zone conFIG.d to be within the ECDN (potentially after first resolving a CNAME from hr.akamai.com to itself for hr.ecdn.akamai.com). At step (3), the query is then referred to an ECDN name server 406, with the ECDN name server being conFIG.d to be authoritative for the ecdn.akamai.com zone. Some of the steps are compressed in the FIG. for clarity. At step (4), the ECDN zone server 406 could do one of three things: reply with an IP address x.x.x.x, pass the query to a different zone for hr.ecdn.akamai.com, or CNAME the request to a different hostname all together (restarting this process). In the drawing, the ECDN zone server has returned the IP address. Thus, at step (5), the client makes an HTTP request to the ECDN IN 408 at IP address x.x.x.x with a host header: identifying the host hr.akamai.com. At steps (6), (7) and (8), the ECDN content server handles the HTTP portion of the request in the standard fashion for a surrogate. The content is served from the origin server 406.

The technique shown in FIG. 4 provides significant advantages. According to this disclosure, when a DNS query arrives for a hostname known to be associated with given content within the control of (i.e., managed by) the ECDN, the DNS server that receives the query preferably responds in one of three (3) ways: (a) handing back an IP address, e.g., for an ECDN intelligent node that knows how to obtain the requested content from a surrogate or origin server (as illustrated in FIG. 4); (b) executing a zone referral to a next (lower) level in a zone hierarchy (as defined in standard DNS), or (c) CNAMing to another hostname, thereby essentially restarting the lookup procedure. This new CNAME cause the resolution process to start back at the root and resolve a new path, probably along a different path in the hierarchy. At any particular level in the zone hierarchy, there is preferably an associated zone server. Zone servers may operate on the same machines but typically have different IP addresses. Each zone server preferably executes logic that applies the requested hostname against a map which, using known techniques, may be generated from given (static, dynamic, internally-generated or third party-sourced) performance metrics. Thus, a given name query to ECDN-managed content may be serviced in coordination with various sources of distributed network intelligence. As a result, the disclosed technique provides for a distributed, dynamic globally load balanced name service for an enterprise CDN.

From a logical view, hierarchical DNS zones for resolving a particular query within a content delivery network are represented according to the present invention as illustrated in FIG. 5. In this example, it is assumed that an Internet CDN service provider operates over a namespace that is referred to as "akamai." This namespace includes a subdomain of *.ecdn.akamai.com, which, as noted above, is the virtual zone. In this example, the CDNSP manages the zone on the enterprise's behalf. In a normal name query, a request for foo.akamai.com returns some IP address, which is normally fixed. With web hosting, as is well-known, virtual hostnames are often used to allow a single address to handle multiple hostnames. For load balancing, a round robin technique is often used, allowing for one name to be spread across multiple addresses. For virtual zones, preferably there is a many-to-many mapping. In particular, one hostname is spread across a mesh of servers, and one server may handle any number of hostnames. Thus, for example, in a simple case, one could create three (3) hostnames (x, y, and z) and have four (4) servers (having IP addresses: 1.1.1.1, 1.1.1.2, 1.1.1.3, 1.1.1.4). Any hostname query could resolve to any server address, giving twelve (12) combinations of responses to any particular query. Thus, when the server for this virtual zone gets a request, it replies with any of the 12 possible addresses, although significant performance advantages could be gained if it were to use a more intelligent approach. In particular, it is also well-known that geographical and topological location information can be used to send clients to the closest address, and server load can be accounted for as well to try and optimize client response times. A combination of these (with other factors) can be used to determine the best server for handling a particular request.

As described above, so-called Canonical Name (CNAME) records define an alias for an official hostname and are part of the DNS standard. In general, CNAMEing may be thought of as a means for DNS redirection of a client query. As illustrated above, DNS virtual zones and CNAMEs are used with standard surrogate servers to manage ECDN content in a given enterprise.

The CNAME technique may be implemented any number of arbitrary times, while zone referral preferably occurs hierarchically. Generalizing, according to the invention, a given domain may be of the form "*.zone2.zone1.enterprise.com" where "zone1" represents a first or "top" level ECDN zone, "zone2" represents a second or "lower" level ECDN subzone of the top level zone, and so forth. As indicated in FIG. 6, a first level ECDN zone server 600 would handle top level resolutions, and one or more second level ECDN zone servers 602 would handle the next level resolutions, and so forth. The wildcard "*" in the above example indicates that further zone levels may be provided as well, with each level of the zone hierarchy then inheriting the namespace of the levels above it. Thus, the "virtual" nature of the invention is due to the fact that at no time is there necessarily a fixed set of possible hostnames— they may be, and most likely are, produced on-the-fly. Thus, for example, if the enterprise uses an Oracle database for storing financial data, the network administrator may generate domains such as "financials.ecdn.company.com," while the ECDN itself may be creating objects like "component.oracle.financials.ecdn.company.com," or "a.b.c.oracle.financials.ecdn.company.com" etc. Continuing with this example, if a particular ECDN zone server is provided with a name it does not fully recognize, it resolves that portion that is can recognize. Thus, while a first-level ECDN DNS server might do a rough cut of performance and refer a request to another zone, the next zone may have a finer grain metric used for next step resolution.

According to this disclosure, and as illustrated in FIG. 6, assume that given enterprise content has been published to the ECDN and, in particular, to be managed by a second level zone server "hr.ecdn.akamai.com." In this example, a request for resolution of hr.akamai.com is first directed (through a CNAME) to the ecdn.akamai.com top level zone server 600, which then redirects the request (again through a CNAME) to one of the hr.ecdn.akamai.com second level zone servers 602. The second level name servers may be load balanced, e.g., based on network information collected at the zone server pair about connectivity between the remote office and possible locations of the backend servers that host the desired content, as well state information about the load on those servers. The second level name server returns the IP address of an optimal backend server based on the available metrics (e.g., server load, network connectivity, etc.). The use of hierarchical zones in this manner enables the enterprise to build and maintain more relevant "local" information about how client requests should be mapped, thus obviating the building, maintenance and delivery of enterprise-wide request routing maps.

Figure 7:
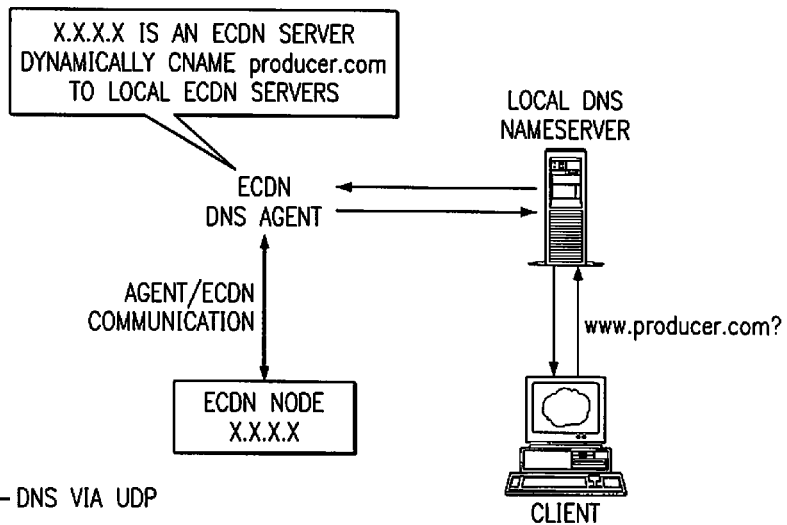
FIG. 7 illustrates a technique for dynamic zone creation through an agent-hinted CNAME according to the disclosed subject matter.

According to another feature, a software agent is executed in or in conjunction with a DNS server to create "zones" dynamically. In this approach, the agent, in effect, provides hints to the enterprise DNS name server as to which enterprise domains would be beneficially cached, as well as the addresses of near-by (local) ECDN intelligent nodes. FIG. 7 illustrates the agent-hinted CNAME technique. To create such as agent, the enterprise may keep a lightweight history databases within a DNS server, recording usage patterns of A (address) record lookup requests. Building heuristics around access patterns or looking for high or relatively increased lookups on a per domain basis might provide candidate hostnames. This would identify high usage HTTP sites. The hints might also come from firewalls, third party updates, in-line L4 switches, or from some other entity listening on port 80 (e.g., perhaps via an egress switch SPAN port). When a domain is identified as potentially interesting from a usage perspective, instead of returning the address of the actual domain, the address of a nearby ECDN IN may be substituted dynamically. After traffic dies down, the address could revert back to standard behavior. Thus, if the "hot" domain is "hr.akamai.com," the DNS name server dynamically CNAMEs the domain to the local ECDN zone server "ecdn.akamai.com" as needed. All traffic to the hr.akamai.com would then get sent to the close-by ECDN IN for handling. Agent interaction may be accomplished as a server plug-in, through WCCP 2.0 transparent interception of DNS traffic, promiscuous DNS port snooping (SPAN mode), or providing an augmented DNS name server. An interface may be provided to notify the agent that all *.ecdn.enterprise.com servers are part of the ECDN and should be sent towards the appropriate servers.

The disclosed subject matter provides numerous advantages over the prior art. According to the techniques described, a domain to be published to the ECDN is associated (either by static configuration or dynamically) with a set of one or more enterprise zones configurable in a hierarchy. When a request for content is received from a given client in the enterprise (or otherwise accessible through the firewall), a name query to the enterprise's legacy DNS is directed (preferably via CNAME) to a set of one or more ECDN zone servers. A given ECDN zone server associates a name query with an ECDN intelligent node (or to a given content server). This association may be based on given conditions within the network, server load conditions, or some combination of various known metrics. With ECDN virtual zones, maps that associate a given request to a server may be local or global, static or dynamic. If multiple zones are used in a hierarchy, a first level ECDN zone server redirects the name query to a second level ECDN zone server, and so on, until the appropriate response is generated. ECDN zone servers may reside on the same machine or with existing DNS infrastructure or other machines in the enterprise. This enables the present invention to be readily integrated into an existing or legacy DNS solution with minimal reconfiguration.

As described and illustrated above, a given zone may have a sub-zone and, according to the invention, that sub-zone may be managed by the enterprise or even by a third party such as an Internet content delivery network (ICDN) service provider. As an example of the latter scenario, assume that the enterprise outsources its streaming video delivery to the ICDN service provider. To this end, a host lookup for, say, allhands.streamingvideo.ecdn.company.com may be conFIG.d either statically or dynamically to a zone managed by a CDN overlay network. This has the effect of transparently allowing delivery to be seamlessly tied internally and externally via the same mechanism.

Figure 8:
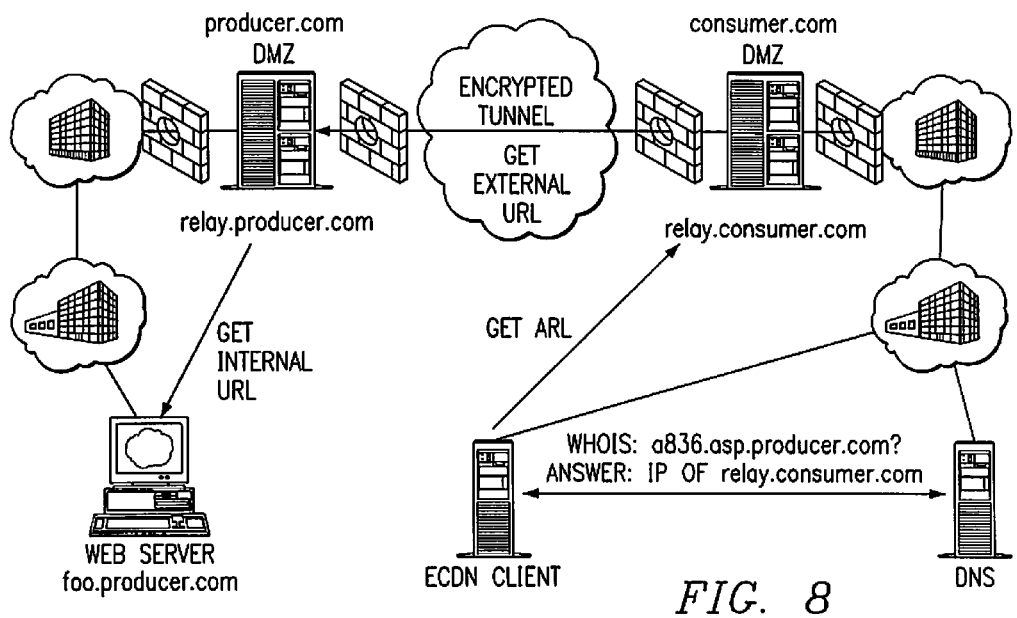
FIG. 8 illustrates a technique for using virtual zones to enable an enterprise partner to access an enterprise ECDN to retrieve intranet content.

FIG. 8 illustrates another example of how an enterprise may hand off management of a virtual zone to another entity, in this case an enterprise business partner. In this example, producer.com is the enterprise and consumer.com is the enterprise business partner having an end user. Producer.com desires to make given content available to the consumer.com end user, however, the producer.com namespace on which the content is published is not resolvable through public DNS and the document is not available publicly. Both producer.com and consumer.com are assumed to have implemented an ECDN system behind each of their respective firewalls, and each entity has a private namespace that they respectively manage. The goal is to make producer.com's namespace selectively available to an end user in consumer.com without, at the same time, exposing producer.com's namespace to the public DNS. Each ECDN deploys a relay machine which, preferably, is a combination of a surrogate origin server and an ECDN zone server. Separate machines/processes may be used, or the processes may be integrated or included with other functionality. Preferably, each relay machine is located within the enterprise DMZ, as illustrated in the drawing. The relay machine inside consumer.com does not know how to resolve a virtual zone associated with producer.com, but that machine does know that the relay machine inside producer.com's firewall does know how to make such a resolution. Likewise, the relay machine inside producer.com does not know how to resolve a virtual zone associated with consumer.com, but that machine does know that relay machine insideconsumer.com's firewall make know how to make such a resolution. As is well-known, boxes within a DMZ can be selectively allowed to communicate with one another while filtering other potentially hostile communications.

Referring back to FIG. 8, assume that the document in question is referenced within consumer.com by a836.asp.producer.com/object.html. In this example, the zone "asp.producer.com" has been designated within consumer.com as being owned or managed by relay.consumer.com. Thus, relay.consumer.com will act as a surrogate for that document. When the consumer.com relay gets the host header a836.asp.producer.com, the relay machine uses that information to connect to the relay machine in producer.com. The relay machine in producer.com gets the HTTP request and it is conFIG.d to rewrite any host header (associated with a836.asp.producer.com in this example) to foo.producer.com. The relay machine at relay.producer.com then acts as a surrogate origin server for the web server at foo.producer.com, which hosts the document. The web server then returns the document via the surrogate origin server relay.producer.com, and that server rewrites the response header to point back to itself. The relay machine in producer.com then returns the data to the relay machine in consumer.com, which performs similar surrogate processing and returns the document to the requesting end user. This completes the processing. Thus, one of ordinary skill in the art will appreciate that, in this manner, producer.com has handed off management of the relay.producer.com virtual zone to consumer.com. This arrangement creates a VPN-like connection between the two namespaces to facilitate the document sharing. As illustrated, preferably the communications between the two relay machines are made over secure link using known techniques.

Having thus described my invention, the following sets forth what I now claim.

The invention claimed is:

1. Apparatus associated with an enterprise content delivery network (ECDN), comprising:
   a hardware processor;
   computer memory holding computer program instructions executed by the hardware processor, the computer program instructions operative in association with a domain name service (DNS) server to:
   associate an ECDN domain with a set of one or more enterprise zones configured in a hierarchy; and
   in response to receipt of a query for a hostname known to be associated with given content within the control of the ECDN, return a response by way of: (i) handing back an IP address for an ECDN intelligent node, (ii) execute a zone referral to a next lower level name server in a zone hierarchy, and (iii) aliasing to another hostname.

2. The apparatus as described in claim 1 wherein aliasing to another hostname initiates a resolution process along a different path in the hierarchy.

3. The apparatus as described in claim 1 wherein the ECDN domain is associated with the set of one or more enterprise zones by a static configuration or dynamically.

4. The apparatus as described in claim 1 wherein the query for a hostname is associated with a request for content stored in the enterprise content delivery network.

5. The apparatus as described in claim 1 wherein the enterprise content delivery network is associated with an Internet content delivery network (ICDN).

6. The apparatus as described in claim 5 wherein the computer program instructions are further operative to:
   build a list of the enterprise domains that are candidates for caching, wherein an enterprise domain that is a candidate for caching has associated therewith a set of one or more IP addresses associated with nearby content servers managed as part of the Internet content delivery network (ICDN).

7. The apparatus as described in claim 1 wherein the one or more enterprise zones constitute managed virtual zones.

8. The apparatus as described in claim 1 wherein an enterprise zone is a subtree of a domain name space, wherein names associated with leaves of the subtree correspond to individual hosts whose names resolve to one or more IP addresses.

* * * * *